April 30, 1940.    W. L. STODDARD    2,199,032
TIRE ALARM
Filed Nov. 19, 1938    2 Sheets-Sheet 1

INVENTOR
Wesley L. Stoddard
BY
Munn, Anderson + Liddy
ATTORNEY

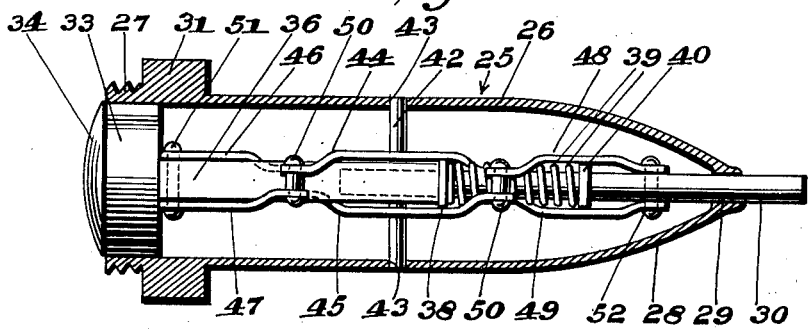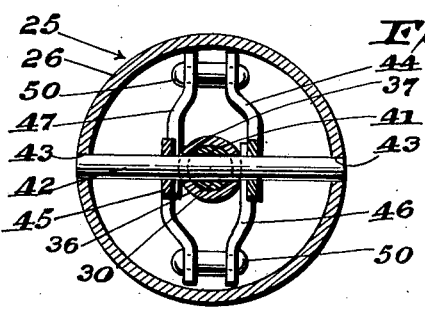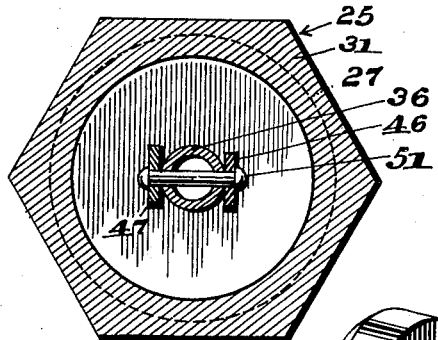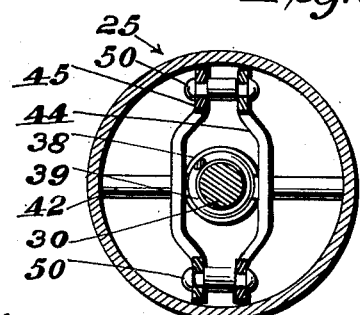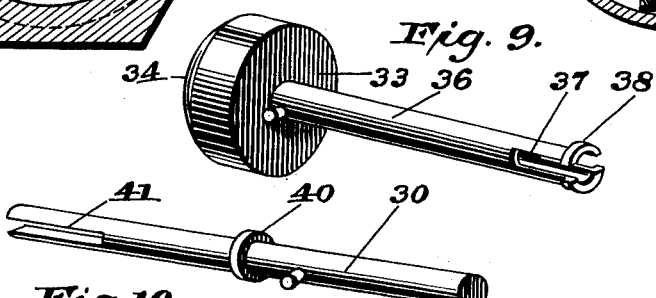

Patented Apr. 30, 1940

2,199,032

UNITED STATES PATENT OFFICE 2,199,032

TIRE ALARM

Wesley L. Stoddard, Elgin, Ariz., assignor of one-half to Arlie H. Harkey, Fairbank, Ariz.

Application November 19, 1938, Serial No. 241,417

5 Claims. (Cl. 200—58)

This invention relates to improvements in tire alarms, said designation implying the use of the device as a means for warning the driver of an automobile or other vehicle of an impending dangerous condition of one or more of the tires. It is quite common to hear and read of serious, and often fatal, accidents having occurred because of the vehicle being thrown out of the control of the driver, because of the upset in equilibrium following the deflation of a tire. This danger is particularly potent because of the current practice to drive vehicles, especially automobiles, at increasingly higher rates of speed. If a tire becomes punctured the driver of the automobile which is moving at a high rate of speed will not have sufficient time in which to bring the automobile to a stop and maintain his control thereof, because virtually all of the air will escape from a punctured tire while the driver undergoes these efforts.

The obvious result is a temporary running wild of the automobile, and this usually ends in a crash of more or less severity. If it were possible for the driver to be forewarned of an impending deflation of one or more of the tires to a dangerously low point, he would be able to begin stopping the vehicle so that by the time the tire has become deflated to the dangerous point he will have brought the automobile to a stop. With this premise in mind the objects of the invention are as follow:

First, to provide an appliance which is permanently attachable to an automobile wheel rim and is so controlled by the condition of inflation of the tire as to coact with an associated alarm device if the air pressure in the tire falls to a determined dangerous value.

Second, to provide a tire alarm which is made to function solely by the condition of inflation of the inner tube of a pneumatic tire, to which end the active element is in constant contact with the outside of said inner tube while the latter is in place, the advantage of the latter arrangement lying in the fact that access does not have to be had to the compressed air within said tube for the operation of the alarm.

Third, to provide a tire alarm which is so proportioned and installed upon the rim of a wheel that the latter can be laid flat upon the floor for the purpose of changing tires without interfering with the active element of the alarm.

Other objects and advantages will appear in the following specification, reference being had to the accompanying drawings, in which:

Figure 5 is a longitudinal section taken on the line 5—5 of Fig. 2.

Figure 6 is a cross section taken on the line 6—6 of Fig. 2.

Figure 7 is a cross section taken on the line 7—7 of Fig. 2.

Figure 8 is a cross section taken on the line 8—8 of Fig. 2.

Figure 9 is a detail perspective view of the tube and piston.

Figure 10 is a detail perspective view of the coacting plunger rod.

Figure 1:
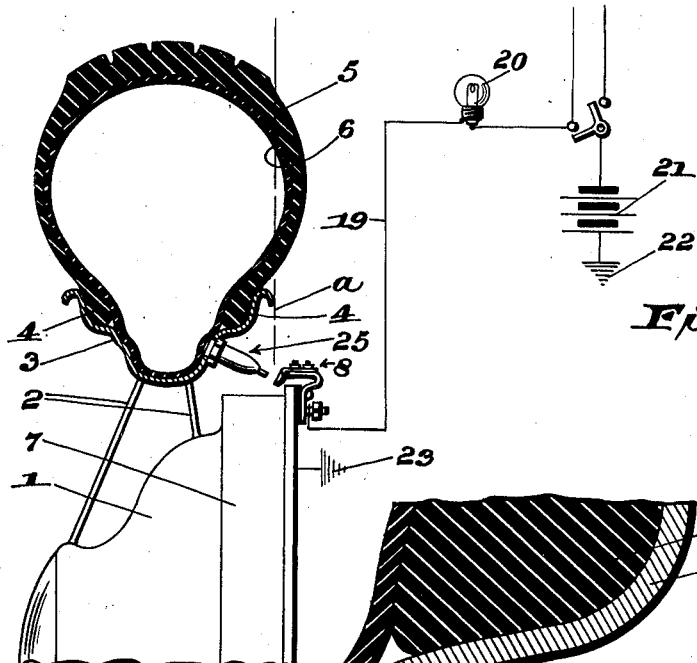
Figure 1 is a diagrammatic sectional view illustrating the general combination of the improved tire alarm.

In Fig. 1 the partially illustrated wheel 1 is shown as including spokes 2 of any known type, these spokes or the equivalent thereof carrying the metal rim 3. This rim is shown as comprising the modern drop-center type, but it should be understood that the invention is applicable to any other known type of rim. This rim has the beads 4 of a tire casing 5 secured therein, said tire casing containing a customary inner tube 6. This inner tube is adapted to be inflated with air under pressure, and when the pressure falls to a determinable value, the tire alarm is made to function in a manner presently explained.

Figure 3:
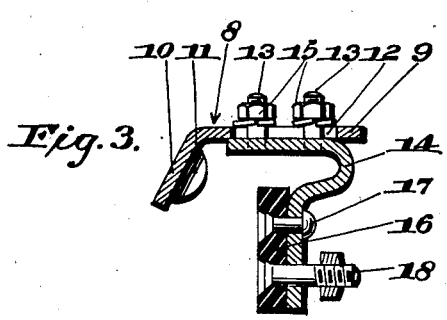
Figure 3 is a central vertical section of the stationary electrical contact.
Figure 4:
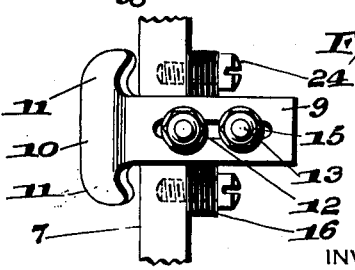
Figure 4 is a plan view of said contact.

The wheel 1 includes a brake drum. This drum revolves adjacently to a brake backing plate 7. This plate is stationary, and it provides the convenient mount for an electrical contact, the details of which are as follows:

Said contact is generally designed 8 (Figs. 3 and 4). It comprises a plate 9 which has an angled and backwardly flared lip 10 at one extremity. The flares are designated 11, and their purpose is to provide for an easy approach of the plunger rod when the automobile is going either forwardly or backwardly. A slot 12 provides an outlet for a pair of screw studs 13 which project upwardly from a base member 14.

The plate 9 is seated upon the base member. The provision of the pair of studs insures keeping the lip 10 in the proper position upon the drum housing 7 so that the previously mentioned plunger rod will be sure to engage when the occasion arises. Nuts 15 are screwed onto the studs 13 and by loosening these nuts it becomes possible to adjust the plate 9, thereby to station the lip 10 as closely to or as far from the plunger rod as required.

An insulating block 16 provides the mount for the base member 14. The latter is riveted to the block at 17, but it is also secured by a screw 18 which provides one terminal of an electrical circuit. The wire which comprises the respective part of said circuit is designated 19 (Fig. 1). The other end of this wire is connected to a lamp 20, current being supplied by the battery 21, one pole of which is grounded at 22 to the frame (not shown). The housing 7 is similarly grounded at 23. Neither the rivet 17 nor the screw 18 is in electrical connection with any part of the frame. The block 16 is secured to the housing 7 by screws 24 (Fig. 4).

Reference is now made to that portion of the device which has been identified as the active element. Said element is generally designated 25. This comprises a shell 26. The shell has a threaded tip 27 at one end and at the other end 28 is tapered almost to a point. This end stops short of being a point, however, being provided with a passage 29 which provides a guide for the previously mentioned plunger rod 30. That portion of the shell 26 adjacent to the tip 27 has a non-circular formation 31 (Fig. 6). This is adapted to receive an end wrench by which the element 25 is screwed into the rim 3. The latter has a threaded hole 32 to receive the threaded tip 27. A portion of the plunger rod 30 projects beyond the end 28. It is to be noted in particular that the extremity of the plunger lies within the line $a$ (Fig. 1) which represents a plane erected perpendicularly to the axis of the wheel 1. The meaning and advantage of this provision is that when the wheel is removed and will be flat on the floor for tire repairs, there will be no interference with the active element.

A piston 33 is operable in the bore of the shell 26. This piston has a rounded head 34 which produces a slight and easy curvature at 35 in the inner tube 6, avoiding any sharp bends in the latter which might eventually produce a rupture.

The piston 33 is an integral part of a tube 36 (Fig. 9). Its free end is slotted at 37 and terminates in a flange 38. This flange provides the stop for one end of a spring 39. Said spring is carried by the plunger rod 30. The plunger rod has a collar 40 providing a stop for the other end of the spring.

A slot 41 in the inner end of the plunger rod matches the slot 37. The slotted ends of the tube 36 and plunger rod 30 are slidably interfitted (Figs. 2 and 7), a cross pin 42 occupying the common slot. The ends of the cross pin are secured at 43 (Fig. 7) to the shell 26. Movement of the tube and plunger rod occur in respect to the anchored cross pin.

Said pin carries a pair of main links 44, 45, of a toggle linkage, the other components of which comprise pairs of shorter links 46, 47 and 48, 49. These pairs of links are connected to each other by rivets commonly designated 50. The terminals of the toggle linkage are connected at 51 and 52 to the respective tube 36 and plunger rod 30. The toggle linkage comprises an articulated connection between the tube and plunger rod.

The operation of the alarm is readily understood. The spring 39 always tends to expand. Consequently the tube 36 and plunger rod 30 constantly tend to move in the directions of the arrows $b$, $c$. The piston 33 is held from moving as long as the air pressure inside of the tube 6 remains at a predetermined safe value. To this end the tension of the spring 39 is readily affixed, so that the parts of the active element 25 will remain in the approximate position illustrated in Fig. 2 when the tire air pressure is say thirty pounds.

Figure 2:
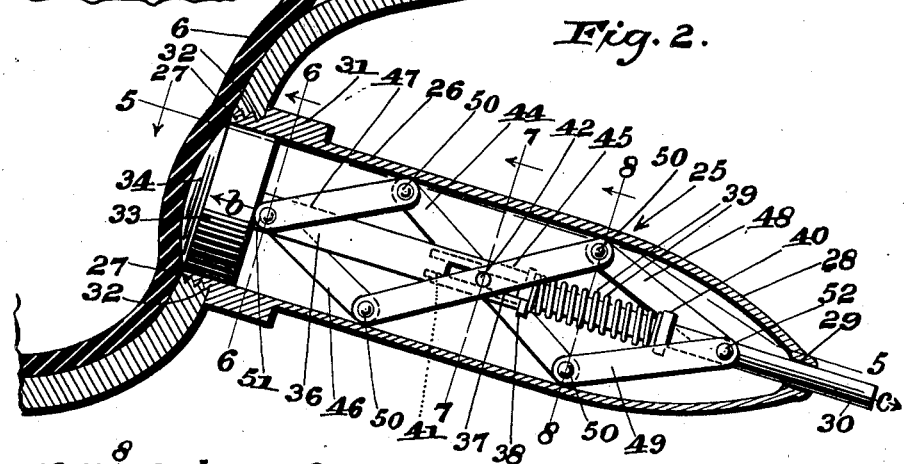
Figure 2 is an enlarged section of a portion of a wheel rim and its associated parts, illustrating the attachment of the active tire alarm element thereto.

If the inner tube 6 starts to become deflated by a loss of some of this air pressure either through a puncture or otherwise, the piston 33 will gradually move inwardly (arrow $b$, Fig. 2). This permissible motion is then transmitted through the toggle linkage to the plunger rod 30 which then partakes of outward motion (arrow $c$, Fig. 2).

This motion is the result of both the expansion of the spring 39 and the action of the toggle linkage. The slotted ends of the tube and plunger rod slide in respect to each other and in respect to the cross pin 42. If the inner tube becomes deflated to a dangerously low value, the plunger rod 30 will become extended so far as to touch the lip 10 of the contact plate 9 on each revolution of the wheel 1.

Current will then pass from one pole of the battery 21 through the grounded portion of the circuit emerging at the end of the plunger rod 30 and reentering the battery by way of the contact plate 9, wire 19 and lamp 20. The intermittent making of the circuit will produce intermittent flashes of the lamp and since the latter is intended to be mounted on the instrument board of the automobile, the driver will be warned of impending danger. In practice the lamp 20 may be substituted by any other desired signal device.

Briefly summarizing what has been stated before, the tire alarm is intended especially for use on modern low pressure tires as employed on high speed automobiles. Such tires become particularly dangerous when partially deflated. By providing a warning in the manner set forth above, while there is still sufficient pressure in the tire to make a quick safe stop, many accidents will be prevented.

The installation is simple and can be made either on new or currently used automobiles. Both the contact 8 and the active element 25 are so sequestered as to minimize the danger of fouling either with water or dirt. The active element 25 comprises a unit which is no larger than a modern rubber valve stem. There is neither any occasion for or danger of changing the contact adjustment when changing wheels or tires.

If a tire should go flat while the automobile is parked, a warning will be immediately flashed to the driver at the first turn of the protected wheel as the vehicle is driven away from the curb. This insures prevention of damage to the tire and tube. The tire alarm can be installed on all five tires, thus insuring uniform protection.

I claim:

1. A tire alarm comprising a shell adapted to be secured to the rim of a wheel, means in said shell having a pair of components movable in opposite directions, means under tension and acting upon said components to tend to produce the separating movement, therefore adapting one of said components to be in constant pressure contact with the inner tube of a tire on said rim, and an electrical contact relatively stationary in respect to said wheel, being normally spaced from the second one of said pair of components but engageable thereby upon yielding of the inner tube to the pressure of said one component when its air content is diminished to a determined value.

2. A tire alarm comprising a shell adapted to be secured to the rim of a wheel, a pair of members in the shell, loosely coupled means joining said members permitting movement thereof relatively to each other and to the shell, a spring tending to move said members relatively to each other, thereby maintaining the contact of one of said members with the inner tube of a tire on said rim, and an electrical contact stationarily situated relatively to said wheel, said contact being initially spaced from the other member but contactible by the latter upon relative movement of said members following a lessening of air pressure in said inner tube.

3. In a tire alarm, a shell securable to a rim and having open ends, a piston and a plunger rod operable in the respective open ends, a spring exercising constant separating pressure to extend the piston and plunger rod, and articulated means connecting said piston and plunger rod to limit the extension of the plunger rod as the piston is obstructed from extension by abutment against an inflated inner tube.

4. In a tire alarm, a shell securable to a rim and having open ends, a piston and a plunger rod operable in the respective open ends, a spring exercising a constant separating pressure to extend the piston and plunger rod, a linkage having means by which it is mounted in the shell, and pivotal connections between the ends of the linkage and the respective piston and plunger rod.

5. In a tire alarm, a shell securable to a rim and having open ends, a piston and a plunger rod operable in the respective open ends, a tube attached to the piston and slidably containing a portion of the plunger rod, the contiguous ends of the tube and plunger rod being slotted, a cross pin connected to the shell and passing through both slots, a spring arranged to separate the tube and plunger rod, and a linkage mounted on the cross pin, having its terminals connected to the respective tube and plunger rod.

WESLEY L. STODDARD.